(12) United States Patent
Allman

(10) Patent No.: US 11,162,623 B2
(45) Date of Patent: Nov. 2, 2021

(54) UNITIZED MALE HOSE FITTING

(71) Applicant: WINZELER STAMPING COMPANY, Montpelier, OH (US)

(72) Inventor: Michael E. Allman, Montpelier, OH (US)

(73) Assignee: WINZELER STAMPING COMPANY, Montpelier, OH (US)

(*) Notice: Subject to any disclaimer, the term of this patent is extended or adjusted under 35 U.S.C. 154(b) by 315 days.

(21) Appl. No.: 16/117,333

(22) Filed: Aug. 30, 2018

(65) Prior Publication Data
US 2019/0072218 A1 Mar. 7, 2019

Related U.S. Application Data

(60) Provisional application No. 62/554,285, filed on Sep. 5, 2017.

(51) Int. Cl.
*F16L 33/213* (2006.01)
*F16L 13/14* (2006.01)
*F16L 15/00* (2006.01)

(52) U.S. Cl.
CPC ............ *F16L 33/213* (2013.01); *F16L 13/147* (2013.01); *F16L 15/006* (2013.01)

(58) Field of Classification Search
CPC ................................................... F16L 33/213
USPC ........................................................ 285/258
See application file for complete search history.

(56) References Cited

U.S. PATENT DOCUMENTS

| | | | | |
|---|---|---|---|---|
| 1,753,005 A * | 4/1930 | Grady | ............. | F16L 33/213 |
| | | | | 29/507 |
| 1,759,224 A * | 5/1930 | Burns | ............. | F16L 33/213 |
| | | | | 29/507 |
| 1,915,041 A * | 6/1933 | Wallace | ............. | F16L 33/26 |
| | | | | 285/258 |
| 1,974,383 A * | 9/1934 | Wallace | ............. | F16L 33/213 |
| | | | | 285/258 |
| 1,987,100 A * | 1/1935 | Burns | ............. | F16L 33/213 |
| | | | | 285/62 |
| 2,146,756 A * | 2/1939 | Miller | ............. | F16L 33/213 |
| | | | | 285/258 |
| 2,228,018 A * | 1/1941 | Scholtes | ............. | F16L 33/213 |
| | | | | 285/222.4 |
| 2,262,171 A * | 11/1941 | Downes | ............. | B25B 27/10 |
| | | | | 72/386 |

(Continued)

FOREIGN PATENT DOCUMENTS

DE 2557026 A1 * 6/1977 ............. F16L 33/213
FR 2480900 A3 * 10/1981 ............. F16L 33/213

*Primary Examiner* — David Bochna
(74) *Attorney, Agent, or Firm* — Shumaker, Loop & Kendrick, LLP; James D. Miller

(57) ABSTRACT

A fitting assembly comprises a male coupling having a male thread and an aperture defining an inner circumferential surface of the male coupling. The inner circumferential surface includes a plurality of spaced apart grooves. A tail piece is at least partially received in the aperture of the male coupling. A hose is received and compressed in a space formed between the inner circumferential surface of the male coupling and an outer circumferential surface of the tail piece. The hose is deformed into the plurality of the spaced apart grooves formed in the inner circumferential surface of the male coupling to form an interference fit therebetween.

18 Claims, 7 Drawing Sheets

(56) References Cited

U.S. PATENT DOCUMENTS

| | | | | |
|---|---|---|---|---|
| 2,262,228 | A | * | 11/1941 | Garretson .............. F16L 33/213 |
| | | | | 285/258 |
| 2,268,142 | A | * | 12/1941 | Lusher .................. F16L 33/213 |
| | | | | 285/258 |
| 2,377,010 | A | * | 5/1945 | Howard ................. F16L 33/213 |
| | | | | 285/148.13 |
| 2,562,116 | A | * | 7/1951 | Nelson .................. F16L 33/213 |
| | | | | 285/258 |
| 2,623,837 | A | * | 12/1952 | Butler ................... F16L 33/213 |
| | | | | 156/221 |
| 2,902,299 | A | * | 9/1959 | Turner .................. F16L 33/213 |
| | | | | 285/258 |
| 3,211,476 | A | * | 10/1965 | Wagner ................. F16L 33/213 |
| | | | | 285/258 |
| 3,490,793 | A | * | 1/1970 | Wagner ................. F16L 33/213 |
| | | | | 285/93 |
| 4,006,923 | A | * | 2/1977 | Wagner ................. F16L 33/213 |
| | | | | 285/39 |
| 4,962,582 | A | * | 10/1990 | Puls ...................... F16L 33/213 |
| | | | | 29/469.5 |
| 5,096,234 | A | * | 3/1992 | Oetiker ................. F16L 33/213 |
| | | | | 285/256 |
| 5,233,739 | A | * | 8/1993 | Holden ................. F16L 33/213 |
| | | | | 138/121 |
| 6,217,082 | B1 | * | 4/2001 | Orcutt ................... F16L 33/213 |
| | | | | 285/258 |
| 6,308,993 | B1 | * | 10/2001 | Phillips ............... F16L 33/2071 |
| | | | | 285/256 |
| 7,121,591 | B2 | * | 10/2006 | Foti ........................ F16L 33/26 |
| | | | | 285/258 |
| 2008/0001400 | A1 | * | 1/2008 | Winzeler ............... F16L 33/213 |
| | | | | 285/258 |

\* cited by examiner

UNITIZED MALE HOSE FITTING

CROSS-REFERENCE TO RELATED APPLICATIONS

This patent application claims the benefit of U.S. Provisional Patent Application Ser. No. 62/554,285, filed on Sep. 5, 2017. The entire disclosure of the above patent application is incorporated herein by reference.

FIELD

The present technology relates to fluid tight fitting assemblies for hoses, and more particularly to a unitized male hose fitting.

INTRODUCTION

This section provides background information related to the present disclosure which is not necessarily prior art.

As commonly known, a hose such as a garden hose typically includes a fitting assembly at each end of the hose. One end typically includes a female fitting assembly having recessed threads to couple with a complementary male threaded water source or a male fitting assembly of another hose. The opposing end typically includes a male fitting assembly having threads disposed on an outer surface thereof configured to accept and couple with a female threaded accessory such as a nozzle, spray gun, a sprinkler, a pressure washer, a wand, and various other devices.

Many current male fitting assemblies utilize a ribbed ferrule formed from a heavy material such as brass. However, there is currently a movement away from the use of the heavy material such as brass in favor of the use of a lighter material such as aluminum for forming such male fitting assemblies. The lighter material is preferable in many circumstances as they are capable of being manufactured as larger parts while having the same or less total weight in comparison to parts formed with the heavier material.

Accordingly, it is desirable to produce an easy to manufacture male fitting assembly for providing a fluid tight seal in the absence of a ribbed ferrule formed from a heavy material.

SUMMARY

The present technology includes articles of manufacture, systems, and processes that relate to a unitized fitting assembly having features that provide certain benefits over the use of a traditional ribbed ferrule formed of a heavy material. In particular, the unitized fitting assembly can be formed of components and materials lighter than a comparable brass component.

Embodiments of the fitting assembly include a male coupling, a tail piece, and a hose. The male coupling includes an aperture, an inner circumferential surface, and a plurality of spaced apart grooves. The aperture extends through the male coupling from a first end to a second end thereof. The inner circumferential surface defines the aperture. The plurality of spaced apart grooves is disposed along a portion of the inner circumferential surface. The tail piece includes an outer circumferential surface, where the tail piece is at least partially received in the aperture of the male coupling. The hose includes a wall defining a central aperture therethrough. The wall is received and compressed in a space formed between the inner circumferential surface of the male coupling and the outer circumferential surface of the tail piece. The wall is deformed into the plurality of the spaced apart grooves disposed along the portion of the inner circumferential surface of the male coupling.

Other embodiments include a fitting assembly comprising a male coupling having a male thread and an aperture defining an inner circumferential surface of the male coupling. The inner circumferential surface includes a plurality of spaced apart grooves. A tail piece is at least partially received in the aperture of the male coupling. A hose is received and compressed in a space formed between the inner circumferential surface of the male coupling and an outer circumferential surface of the tail piece. The hose is deformed into the plurality of the spaced apart grooves formed in the inner circumferential surface of the male coupling to form an interference fit therebetween.

Still further embodiments include methods of forming a unitized male fitting assembly comprising the steps of: inserting a portion of a tail piece into an aperture of a male coupling, a space formed between an inner circumferential surface of the male fitting and an outer circumferential surface of the tail piece; inserting a hose into the space; and deforming the tail piece radially outwardly to deform the hose into a plurality of spaced apart grooves formed in the inner circumferential surface of the male coupling.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
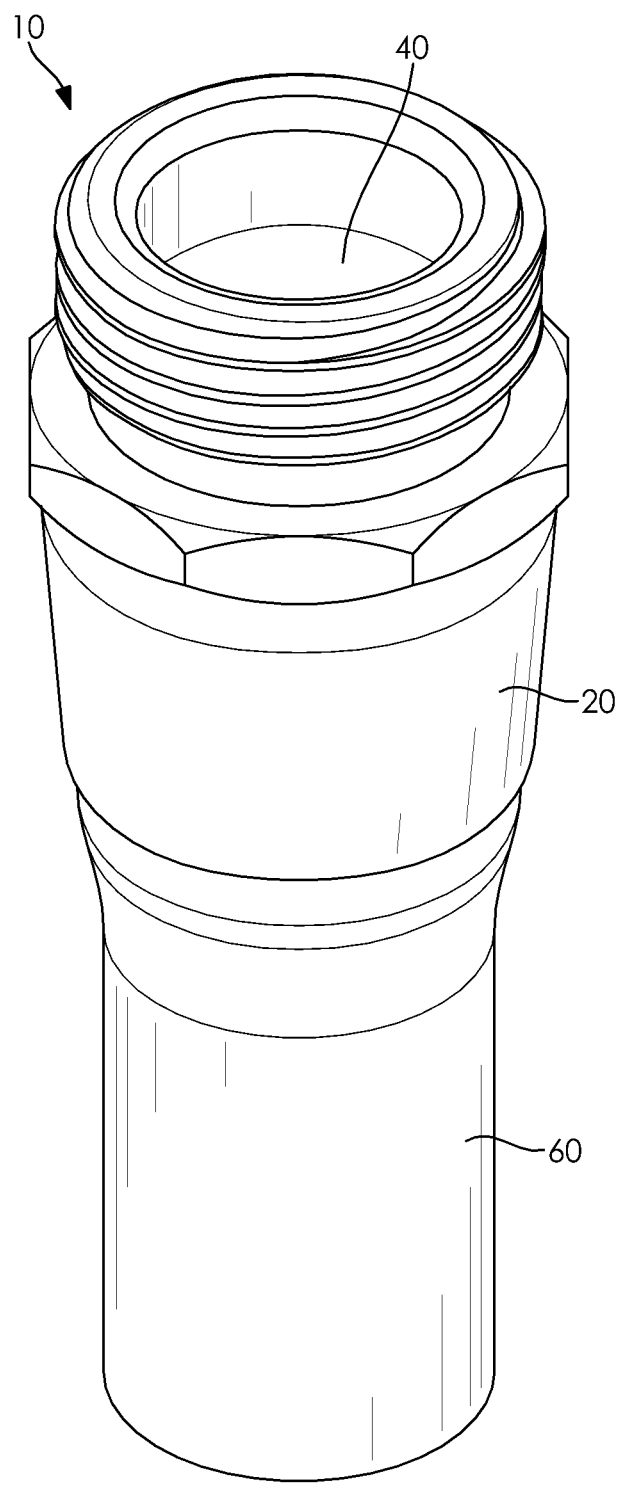
FIG. 1 is a top perspective view of unitized male fitting assembly according to an embodiment of the present technology.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-10 illustrate a unitized male fitting assembly 10 according to a first embodiment of the present technology. The unitized male fitting assembly 10 is configured for coupling to a hose 60 and comprises a male coupling 20 and a tail piece 40.

Figure 2:
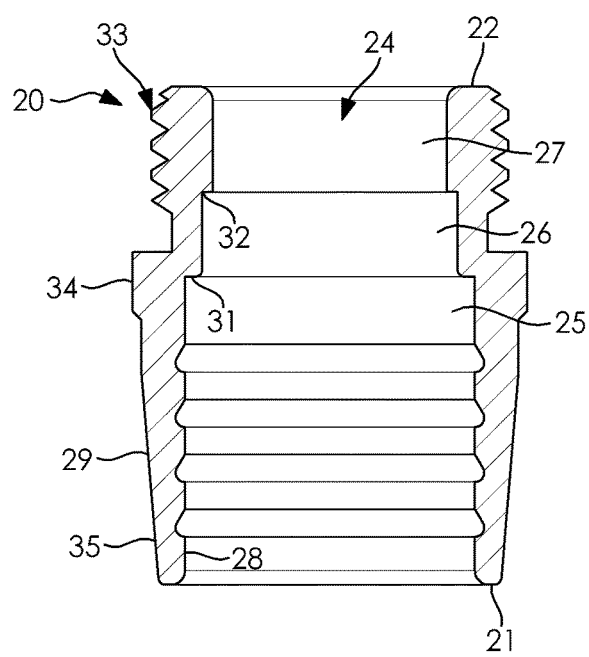
FIG. 2 is a cross-sectional elevational view of the male coupling of the unitized male fitting assembly of FIG. 1.
Figure 3:
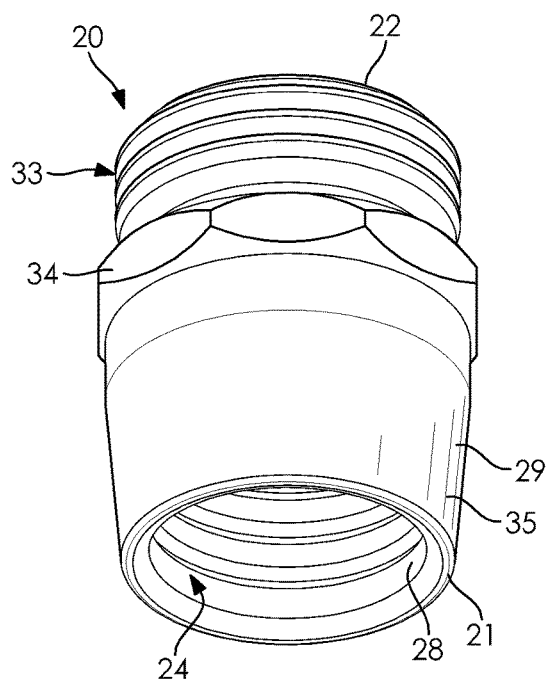
FIG. 3 is a bottom perspective view of the male coupling of FIG. 2.
Figure 4:
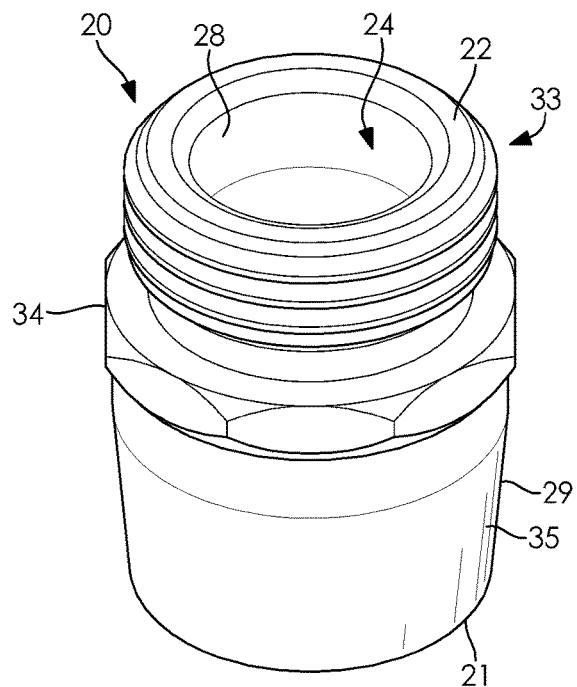
FIG. 4 is a top perspective view of the male coupling of FIG. 2.

As shown in FIGS. 2-4, the male coupling 20 is substantially cylindrical in shape and includes an aperture 24 extending through the male coupling 20 from a first end 21 to a second end 22 thereof. The aperture 24 is substantially cylindrical in shape and includes a stepped profile defining a large diameter portion 25 adjacent the first end 21 of the male coupling 20, a small diameter portion 27 adjacent the second end 22 of the male coupling 20, and an intermediate diameter portion 26 between the large diameter portion 25 and the small diameter portion 27. The intermediate diameter portion 26 has a smaller diameter than the large diameter portion 25 and the small diameter portion 25 has a smaller diameter than the intermediate diameter portion 26. An inner circumferential surface 28 of the male coupling 20 defining the aperture 24 includes a first shoulder 31 formed at a boundary between the large diameter portion 25 and the intermediate diameter portion 26 and a second shoulder 32 formed at a boundary between the intermediate diameter portion 26 and the small diameter portion 27. The inner circumferential surface 28 of the male coupling 20 further includes a plurality of axially spaced apart grooves 30 disposed along a portion of the inner circumferential surface 28 of the male coupling 20 corresponding to the large diameter portion 25 of the aperture 24. Each of the grooves 30 forms a radially outwardly extending indentation in the inner circumferential surface 28 of the male coupling 20.

An outer circumferential surface 29 of the male coupling 20 includes a male thread 33 disposed at the second end 22 thereof. The male thread 33 is configured to be received within and cooperate with a corresponding female thread (not shown) of a complimentary female coupling (not shown) for coupling the male coupling 20 and hence the unitized male fitting assembly 10 to the female coupling. The outer circumferential surface 29 may further include a tool engaging portion 34 configured for engaging a suitable tool such as a wrench for gripping and manipulating the male coupling 20. The tool engaging portion 34 may for example have a substantially octagonal perimeter shape similar to a nut, but alternative perimeter shapes may be used without departing from the scope of the present technology. A skirt 35 of the outer circumferential surface 29 of the male coupling 20 extends from the tool engaging portion 34 to the first end 21 of the male coupling 20 and substantially coincides with the large diameter portion 25 of the aperture 24 extending through the interior of the male coupling 20.

Figure 5:
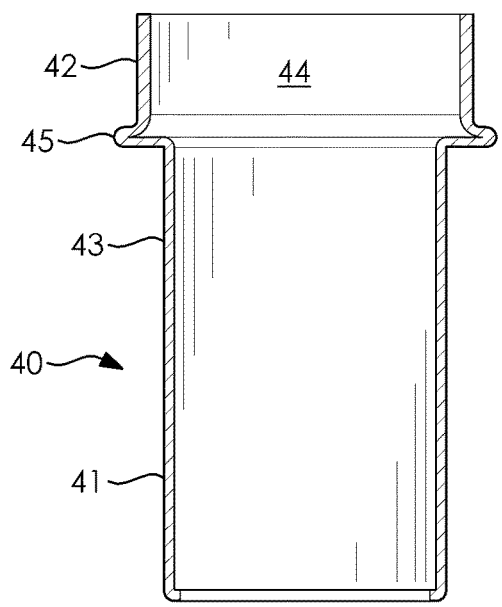
FIG. 5 is a cross-sectional elevational view of a tail piece of the unitized male fitting assembly of FIG. 1.
Figure 6:
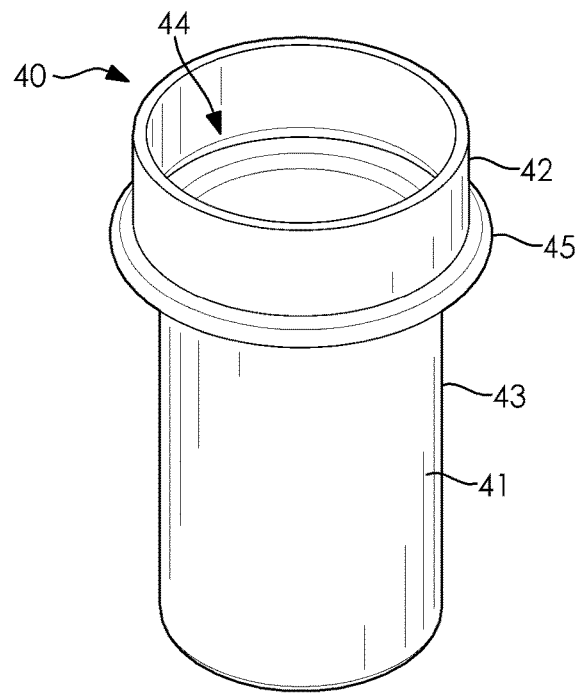
FIG. 6 is a top perspective view of the tail piece of FIG. 5.
Figure 7:
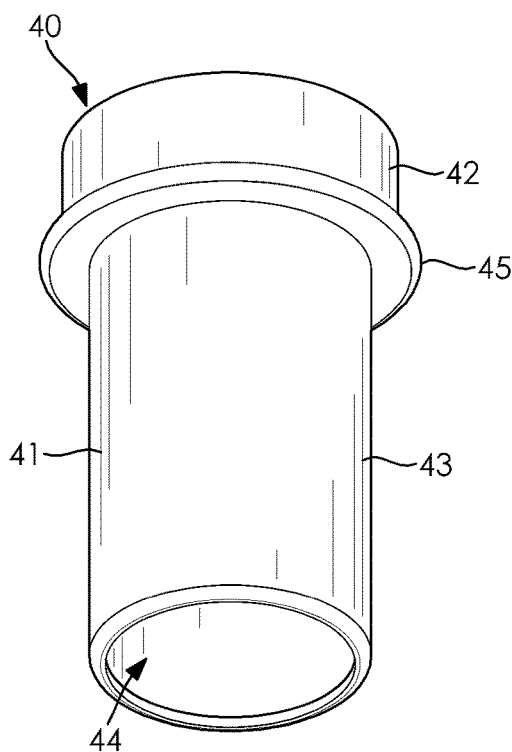
FIG. 7 is a bottom perspective view of the tail piece of FIG. 5.

Now referring to FIGS. 5-7, the tail piece 40 is thin-walled and substantially cylindrical in shape with an aperture 44 extending longitudinally therethrough. An outer circumferential surface 41 of the tail piece 40 includes a large diameter portion 42 and a small diameter portion 43, wherein the large diameter portion 42 has a larger diameter than the small diameter portion 43. The large diameter portion 42 of the tail piece 40 has substantially the same diameter as the intermediate diameter portion 26 of the aperture 24 of the male coupling 20. A radially outwardly extending rib 45 projects from the outer circumferential surface 41 of the tail piece 40 at a boundary between the large diameter portion 42 and the small diameter portion 43. The rib 45 may be formed by a folded and outwardly flared portion of an outer wall of the tail piece 40 at the boundary between the large diameter portion 42 and the small diameter portion 43, but alternative configurations may be used without departing from the scope of the present technology. The small diameter portion 43 of the tail piece 40 is spaced a greater distance from a distal end of the rib 45 than is the large diameter 42 of the tail piece 40.

The male coupling 20 and the tail piece 40 may be formed from any suitable materials including metals, plastics, and composites. In some embodiments, the male coupling 20 is formed from aluminum. The tail piece 40 may be selected to have a desired degree of plastic deformability to ensure proper assembly of the unitized male fitting assembly 10, as described in greater detail hereinbelow. The tail piece 40 may be formed from brass, as desired.

Figure 8:
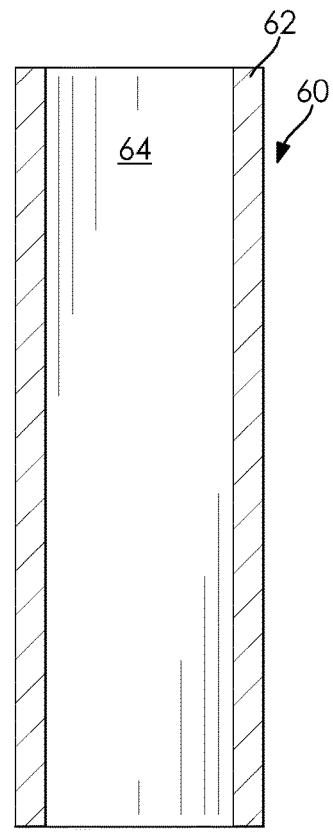
FIG. 8 is a cross-sectional elevational view of a hose of the unitized male fitting assembly of FIG. 1.

As shown in FIG. 8, the hose 60 is formed of a cylindrical wall 62 defining a central aperture 64 through the hose 60. The cylindrical wall 62 has substantially the same outer diameter as the rib 45 of the tail piece 40 and substantially the same inner diameter as the small diameter portion 43 of the tail piece 40. The hose 60 is preferably formed from a polymeric material such as a soft plastic or a rubber having the desired flexibility and deformability to ensure the proper assembly of the unitized male fitting assembly 10.

Figure 9:
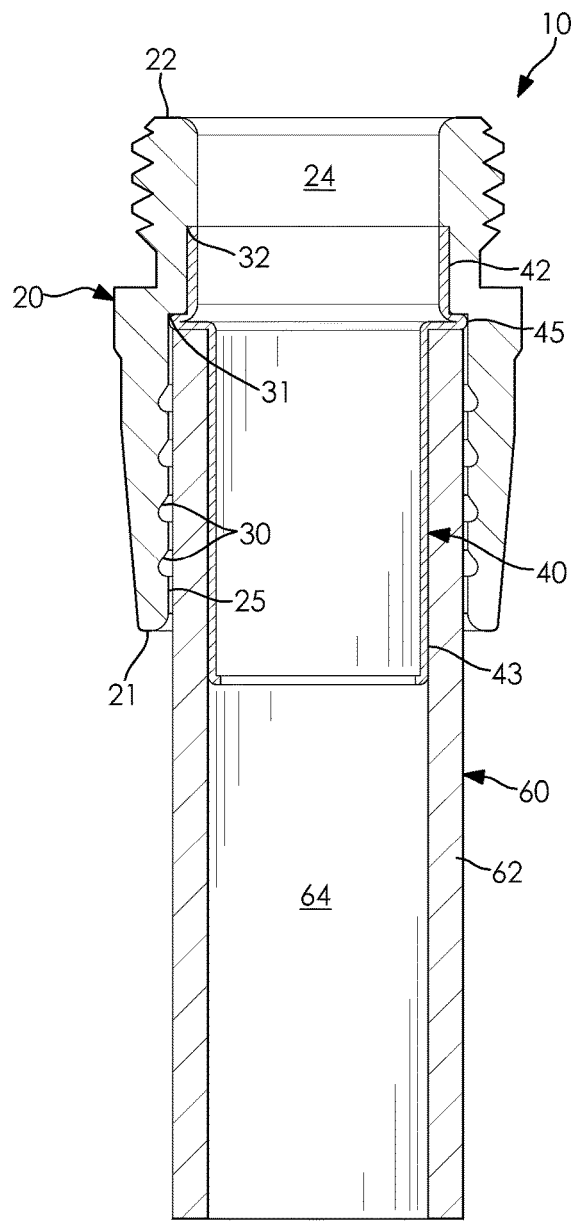
FIG. 9 is a cross-sectional elevational view of the unitized male fitting assembly of FIG. 1 prior to an expansion of the tail piece within the male coupling to affix an axial position of the hose.
Figure 10:
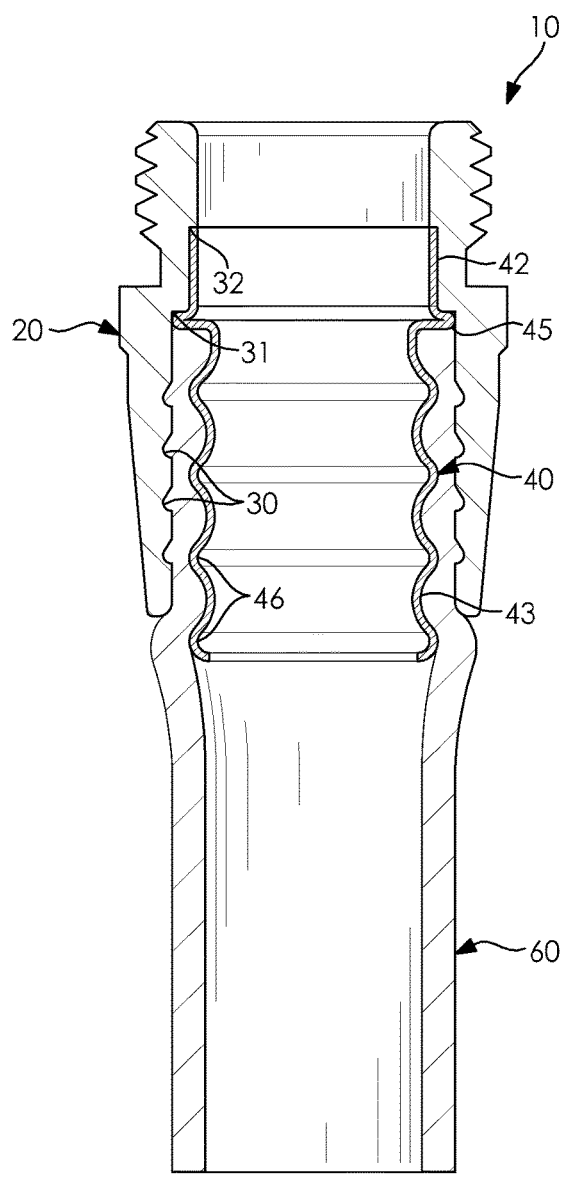
FIG. 10 is a cross-sectional elevational view of the unitized male fitting assembly of FIG. 1 following the expansion of the tail piece within the male coupling to affix the axial position of the hose.

Referring now to FIGS. 9 and 10, the unitized male fitting assembly 10 is assembled as follows. First, the small diameter portion 43 of the tail piece 40 is received in the central aperture 64 of the hose 60 until an end of the hose 60 abuts the rib 45 of the tail piece 40 to form a tail piece 40 and hose 60 assembly. Next, the tail piece 40 and hose 60 assembly is inserted axially into the aperture 24 of the male coupling 20 at the first end 21 thereof. The tail piece 40 and hose 60 assembly is inserted into the aperture 24 until an end of the large diameter portion 42 of the tail piece 40 abuts the second shoulder 32 of the male coupling 20 and until the rib 45 of the tail piece 40 abuts the first shoulder 31 of the male coupling 20. When in this position, a portion of the hose 60 is disposed within the large diameter portion 25 of the male coupling 20 and an outer surface of the portion of the hose 60 is in facing relationship with the plurality of the spaced apart grooves 30 formed in the male coupling 20 while an inner surface of the portion of the hose 60 is in facing relationship with an outer surface of the small diameter portion 43 of the tail piece 40.

A tool (not shown) is then used to deform the tail piece 40 and the hose 60 following the reception of the tail piece 40 and hose 60 assembly into the male coupling 20, as shown in FIG. 10. The tool is inserted into the small diameter portion 43 of the tail piece before the tool pushes radially outwardly on the small diameter portion 43 of the tail piece 40 about a circumference thereof to expand the small diameter portion 43 towards the portion of the hose 60 and the plurality of the spaced apart grooves 30 formed in the male coupling 20. The expansion of the small diameter portion 43 of the tail piece 40 results in the hose 60 being deformed to fill in the plurality of the spaced apart grooves 30 formed in the male coupling 20. The filling of the hose 60 into the grooves 30 forms an interference fit between the hose 60 and the male coupling 20 to prevent further axial movement of the hose 60 relative to the male coupling 20. As shown in FIG. 10, the small diameter portion 43 of the tail piece 40 may also be expanded by the tool in a manner wherein the small diameter portion 43 is further deformed to include a plurality of indentations 46 extending radially outwardly towards the hose 60. The plurality of the indentations 46 provides an additional interference fit between the tail piece 40 and the hose 60 for preventing axial movement of the tail piece 40 relative to the hose 60.

Once fully assembled, the aperture 24 of the male coupling 20, the aperture 44 of the tail piece 40, and the aperture 64 of the hose 60 provide fluid communication through an interior of the unitized male fitting assembly 10. The unitized male fitting assembly 10 accordingly provides a fluid tight seal in the absence of use of a ribbed ferrule as is known in the art. The male thread 33 formed on the male coupling 20 further provides a coupling means for coupling the unitized male fitting assembly 10 to a cooperating female component.

Figure 11:
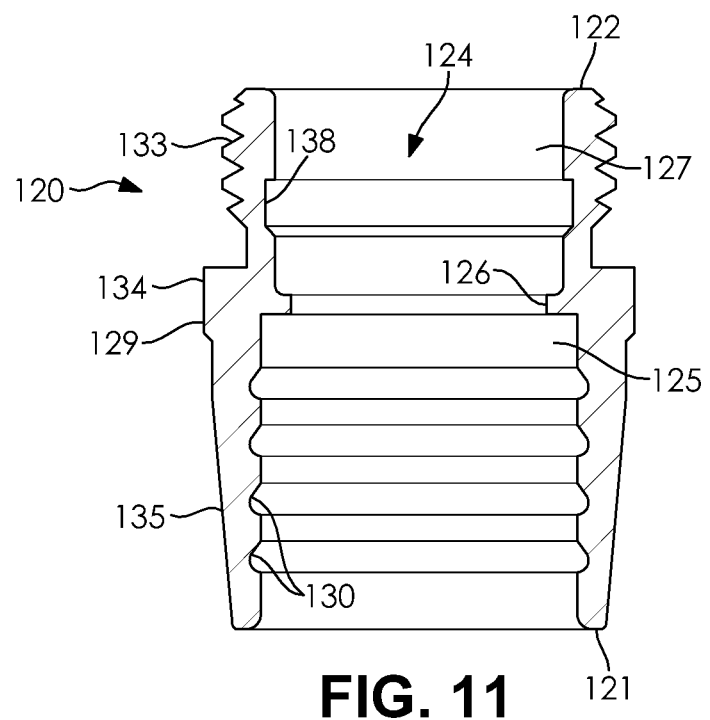
FIG. 11 is a cross-sectional elevational view of a modified male coupling of a unitized male fitting assembly according to another embodiment of the present technology.
Figure 12:
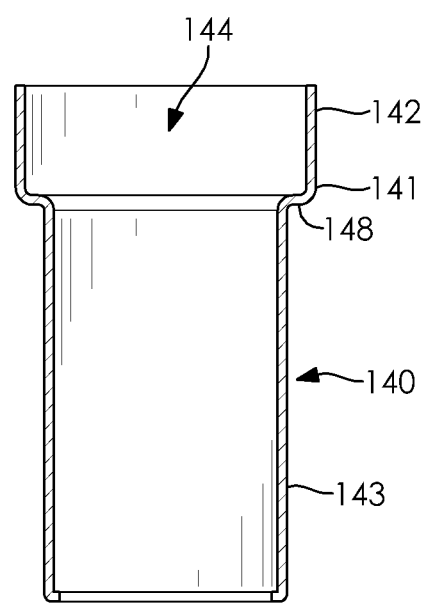
FIG. 12 is a cross-sectional elevational view of a modified tail piece of the unitized male fitting assembly of FIG. 11.

FIGS. 11 and 12 illustrate a modified male coupling 120 and a modified tail piece 140, respectively, for use in a unitized male fitting assembly 110 (shown fully assembled in FIG. 15) according to a second embodiment of the present technology. The unitized male fitting assembly 110 may be used with the hose 60 illustrated in FIGS. 1 and 8-10, as desired.

Referring to FIG. 11, the male coupling 120 is substantially cylindrical in shape and includes an aperture 124 extending through the male coupling 120 from a first end 121 to a second end 122 thereof. The aperture 124 is substantially cylindrical in shape and includes a stepped profile defining a large diameter portion 125 adjacent the first end 121 of the male coupling 120 and a small diameter portion 127 adjacent the second end 122 of the male coupling 120. The small diameter portion 127 has a smaller diameter than the large diameter portion 125.

An inner circumferential surface 128 of the male coupling 120 defining the aperture 124 includes a circumferentially extending rib 126 at a boundary between the large diameter portion 125 and the small diameter portion 127 of the aperture 124. The rib 126 extends radially inwardly from the inner circumferential surface 128 and has a diameter smaller than the small diameter portion 127. The inner circumferential surface 128 of the male coupling 120 also includes a circumferentially extending locking groove 138 spaced axially from the rib 126 and formed within a portion of the male coupling 120 corresponding to the small diameter portion 127 of the aperture 124. The locking groove 138 forms a radially outwardly extending indentation in the inner circumferential surface 128 of the male coupling 120.

The inner circumferential surface 128 of the male coupling 120 further includes a plurality of axially spaced apart grooves 130 along a portion of the inner circumferential surface 128 of the male coupling 120 corresponding to the large diameter portion 125 of the aperture 124. Each of the grooves 130 forms a radially outwardly extending indentation in the inner circumferential surface 128 of the male coupling 120.

An outer circumferential surface 129 of the male coupling 120 includes a male thread 133 disposed at the second end 122 thereof. The male thread 133 is configured to be received within and cooperate with a corresponding female thread (not shown) of a complimentary female coupling (not shown) for coupling the male coupling 120 to the female coupling. The outer circumferential surface 129 may further include a tool engaging portion 134 configured for engaging a suitable tool such as a wrench for gripping and manipulating the male coupling 120. The tool engaging portion 134 may for example have a substantially octagonal perimeter shape, but alternative perimeter shapes may be used without departing from the scope of the present technology. A skirt 135 of the outer circumferential surface 129 of the male coupling 120 extends from the tool engaging portion 134 to the first end 121 of the male coupling 120 and substantially coincides with the large diameter portion 125 of the aperture 124 extending through the interior of the male coupling 120.

As shown in FIG. 12, the tail piece 140 is thin-walled and substantially cylindrical in shape with an aperture 144 extending longitudinally therethrough. An outer circumferential surface 141 of the tail piece 140 includes a large diameter portion 142 and a small diameter portion 143, wherein the large diameter portion 142 has a larger diameter than the small diameter portion 143. The large diameter portion 142 of the tail piece 140 has substantially the same diameter as the small diameter portion 127 of the aperture 124 of the male coupling 120. The tail piece 140 further includes a shoulder 148 formed at a transition from the large diameter portion 142 to the small diameter portion 143 thereof.

The male coupling 120 and the tail piece 140 may be formed from any suitable materials including metals, plastics, and composites. In some embodiments, the male coupling 120 may be formed from aluminum. The tail piece 140 may be selected to have a desired degree of plastic deformability to ensure proper assembly of the unitized male fitting assembly 110, as described in greater detail hereinbelow. The tail piece 140 may be formed from brass, as desired.

Figure 13:
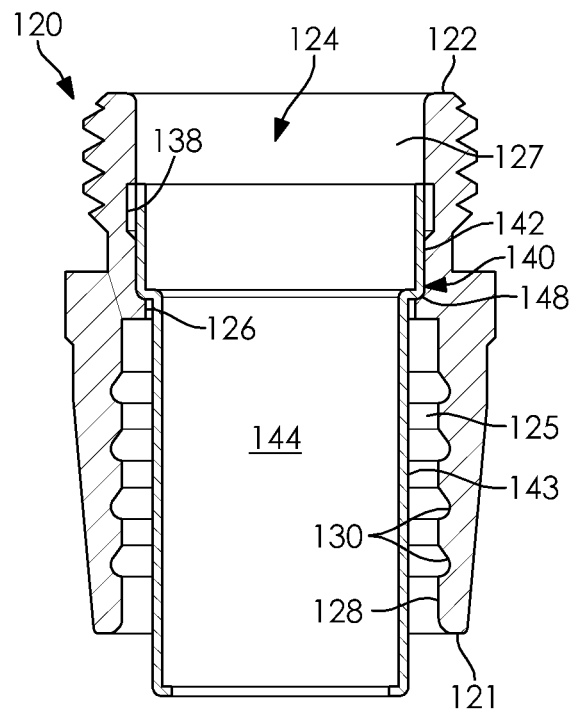
FIG. 13 is a cross-sectional elevational view of the unitized male fitting assembly including the male coupling of FIG. 11 and the tail piece of FIG. 12 prior to an expansion a first portion of the tail piece within the male coupling to affix the tail piece to the male coupling.
Figure 14:
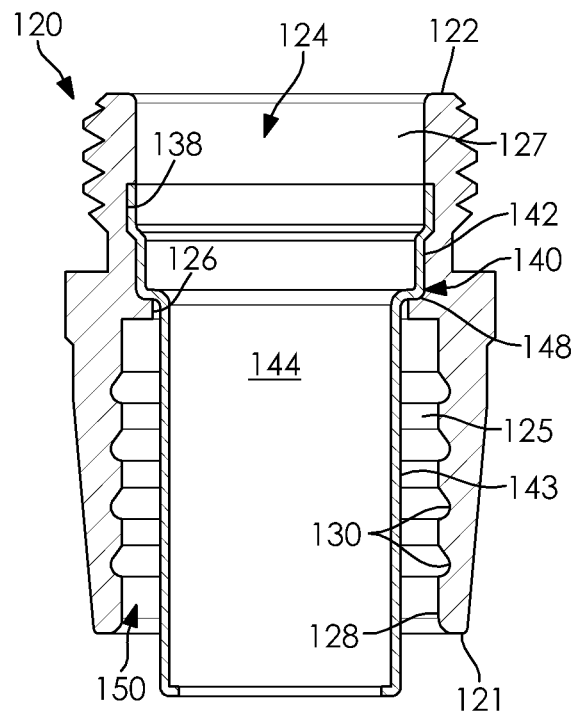
FIG. 14 is a cross-sectional elevational view of the unitized male fitting assembly of FIGS. 11-13 after an expansion of the first portion of the tail piece within the male coupling to affix the tail piece to the male coupling.
Figure 15:
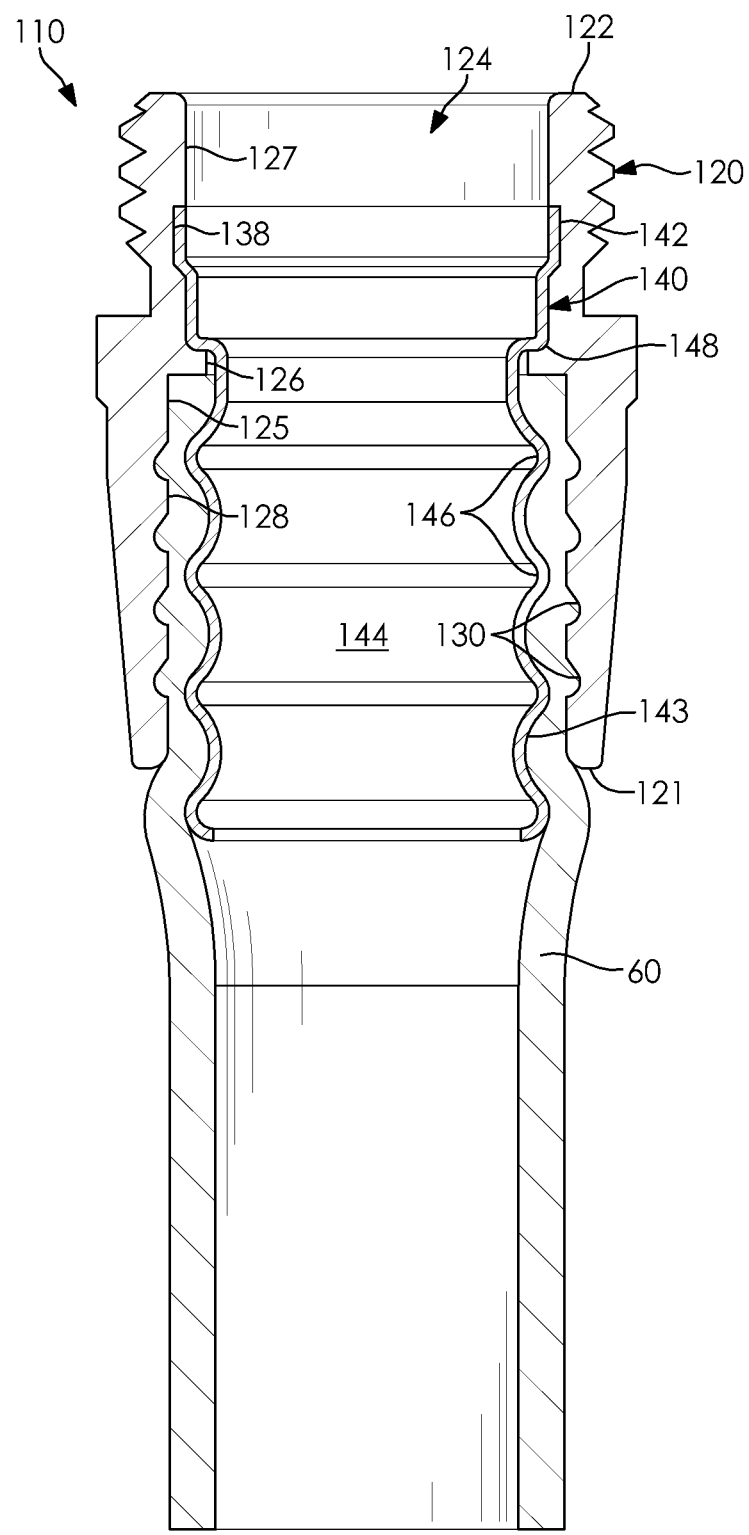
FIG. 15 is a cross-sectional elevational view of the unitized male fitting assembly according to FIGS. 11-14 following an expansion of a second portion of the tail piece within the modified male coupling to affix an axial position of a hose received between the male coupling and the tail piece.

Referring now to FIGS. 13-15, the unitized male fitting assembly 110 having the modified male coupling 120 and tail piece 140 is assembled as follows. First, the small diameter portion 143 of the tail piece 140 is inserted axially through the second end 122 of the male coupling 120 until the shoulder 148 of the tail piece 140 abuts the rib 126 of the male coupling 120, as shown in FIG. 13. When in this position, an end of the large diameter portion 142 of the tail piece 140 is disposed adjacent the locking groove 138 of the male coupling 120. Next, a tool (not shown) is inserted axially into the tail piece 140 before the tool causes the end of the large diameter portion 142 of the tail piece 140 to deform radially outwardly into the locking groove 138 of the male coupling 120, thereby forming an interference fit between the tail piece 140 and the male coupling 120 for preventing axial movement of the tail piece 140 relative to the male coupling 120. The locking of the portion of the large diameter portion 142 of the tail piece 140 in the locking groove 138 is best shown with reference to FIG. 14.

Following the locking of the tail piece 140 into the locking groove 138, a space 150 is formed between an outer surface of the small diameter portion 143 of the tail piece 140 and the inner circumferential surface 128 of the male coupling 120. The hose 60 is then inserted axially into the space 150 until an end of the hose 60 abuts the rib 126 of the male coupling 120.

A tool (not shown) is then used to deform the tail piece 140 and the hose 60. The tool is inserted into the small diameter portion 143 of the tail piece 140 before the tool pushes radially outwardly on the small diameter portion 143 of the tail piece 140 about a circumference thereof to expand the small diameter portion 143 towards the hose 60 and the plurality of the spaced apart grooves 130 formed in the male coupling 120. The expansion of the small diameter portion 143 of the tail piece 140 results in the hose 60 being deformed to fill in the plurality of the spaced apart grooves 130 to form an interference fit between the hose 60 and the male coupling 120 to prevent further axial movement of the hose 60 relative to the male coupling 120. As shown in FIG. 15, the small diameter portion 143 of the tail piece 140 may also be expanded by the tool in a manner wherein the small diameter portion 143 is further deformed to include a plurality of indentations 146 extending radially outwardly towards the hose 60. The plurality of the indentations 146 provides an additional interference fit between the tail piece 140 and the hose 60 for preventing axial movement of the tail piece 140 relative to the hose 60.

Once fully assembled, the aperture 124 of the male coupling 120, the aperture 144 of the tail piece 140, and the aperture 64 of the hose 60 provide fluid communication through an interior of the unitized male fitting assembly 110. The unitized male fitting assembly 110 accordingly provides a fluid tight seal in the absence of use of a ribbed ferrule as is known in the art. The male thread 133 formed on the male coupling 120 further provides a coupling means for coupling the unitized male fitting assembly 110 to a cooperating female component.

The present technology provides certain benefits and advantages. Lighter materials can be employed in the embodiments presented herein as compared to other designs, where lighter materials are preferable in many circumstances as they are capable of being manufactured as larger parts while having the same or less total weight in comparison to parts formed with the heavier materials. The present fitting assemblies provide robust couplings for attachment of various hoses that provide secure fitment and militate against axial movement of the male coupling and tailpiece relative to the hose. Methods of making the fitting assemblies described herein can be applied to materials other than brass (e.g., aluminum) that do not unduly strain or stress that materials. Accordingly, the present technology provides easy to manufacture male fitting assemblies for providing a fluid tight seal without the necessity of using a ribbed ferrule for coupling a hose, where the ferrule is formed from a heavy material.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A fitting assembly comprising:
 a male coupling further comprising an inner circumferential surface defining an aperture extending through the male coupling from a first end to a second end of the male coupling, the aperture of the male coupling having a central axis, and a plurality of spaced apart annular grooves formed along the inner circumferential surface; and
 a tail piece including an outer circumferential surface, the tail piece at least partially received in the aperture of the male coupling, the male coupling and the tail piece configured to receive a hose therebetween, the hose including a wall defining a central aperture therethrough, the wall compressed in a space formed between the inner circumferential surface of the male coupling and the outer circumferential surface of the tail piece, the wall deformed into the plurality of spaced apart annular grooves disposed along the inner circumferential surface of the male coupling, the tail piece extending axially outwardly beyond the first end of the male coupling when the fitting assembly is fully assembled, wherein the tail piece includes a large diameter portion and a small diameter portion, wherein the outer circumferential surface of the tail piece at the large diameter portion has a larger diameter than the outer circumferential surface of the tail piece at the small diameter portion, wherein a radially outwardly extending rib projects from the outer circumferential surface of the tail piece outwardly beyond the large diameter portion of the tail piece, and wherein the rib is disposed at a boundary between the small diameter portion of the tail piece and the large diameter portion of the tail piece.

2. The fitting assembly of claim 1, wherein the aperture of the male coupling includes a stepped profile defining a large diameter portion adjacent the first end of the male coupling, a small diameter portion adjacent the second end of the male coupling, and an intermediate diameter portion between the large diameter portion and the small diameter portion, the intermediate diameter portion of the aperture having a smaller diameter than the large diameter portion of the aperture and the small diameter portion of the aperture having a smaller diameter than the intermediate diameter portion of the aperture, wherein diameters of each of the first diameter portion, the second diameter portion, and the third diameter portion of the aperture are substantially constant.

3. The fitting assembly of claim 2, wherein the inner circumferential surface of the male coupling defining the aperture of the male coupling includes a first shoulder formed at a boundary between the large diameter portion of the aperture and the intermediate diameter portion of the aperture and a second shoulder formed at a boundary between the intermediate diameter portion of the aperture and the small diameter portion of the aperture.

4. The fitting assembly of claim 1, wherein each of the plurality of annular grooves forms a radially outwardly extending indentation in the inner circumferential surface of the male coupling.

5. The fitting assembly of claim 1, wherein an outer circumferential surface of the male coupling includes a male thread disposed at the second end thereof, the male thread configured to be received within and cooperate with a corresponding female thread.

6. The fitting assembly of claim 5, wherein the outer circumferential surface includes a tool engaging portion configured to facilitate gripping and manipulating of the male coupling by a tool.

7. The fitting assembly of claim 6, wherein a skirt of the outer circumferential surface of the male coupling extends from the tool engaging portion to the first end of the male coupling.

8. The fitting assembly of claim 1, wherein the large diameter portion of the tail piece has substantially the same diameter as an intermediate diameter portion between the large diameter portion and the small diameter portion of the aperture of the male coupling.

9. The fitting assembly of claim 1, wherein the wall of the hose has substantially the same outer diameter as the rib of the tail piece and substantially the same inner diameter as the small diameter portion of the tail piece.

10. The fitting assembly of claim 1, wherein the outer circumferential wall of the small diameter portion of the tail piece is expanded and deformed to include a plurality of indentations extending radially outwardly towards the wall of the hose.

11. The fitting assembly of claim 1, wherein the aperture of the male coupling includes a stepped profile defining a large diameter portion adjacent the first end of the male coupling and a small diameter portion adjacent the second end of the male coupling, the small diameter portion of the aperture having a smaller diameter than the large diameter portion of the aperture.

12. The fitting assembly of claim 11, wherein the inner circumferential surface of the male coupling defining the aperture of the male coupling includes a radially inwardly extending rib at a boundary between the large diameter portion and the small diameter portion of the aperture, the rib extending radially inwardly from the inner circumferential surface and having a diameter smaller than the small diameter portion.

13. The fitting assembly of claim 12, wherein the inner circumferential surface of the male coupling includes a locking groove spaced axially from the rib and formed within a portion of the male coupling corresponding to the small diameter portion of the aperture of the male coupling, the locking groove forming a radially outwardly extending indentation in the inner circumferential surface of the male coupling.

14. The fitting assembly of claim 13, wherein the large diameter portion of the tail piece has substantially the same diameter as the small diameter portion of the aperture of the male coupling.

15. The fitting assembly of claim 1, wherein the tail piece includes a shoulder formed at a transition from the large diameter portion to the small diameter portion thereof.

16. The fitting assembly of claim 15, wherein the shoulder of the tail piece abuts the rib of the male coupling, wherein an end of the large diameter portion of the tail piece is disposed adjacent the locking groove of the male coupling, and wherein a portion of the end of the large diameter portion of the tail piece is deformed radially outwardly into the locking groove of the male coupling.

17. The fitting assembly of claim 1, wherein the small diameter portion of the tail piece is expanded and deformed to include a plurality of indentations extending radially outwardly towards the wall of the hose.

18. A fitting assembly comprising:
- a male coupling further comprising an inner circumferential surface defining an aperture extending through the male coupling from a first end to a second end of the male coupling, and a plurality of spaced apart annular grooves formed along the inner circumferential surface; and
- a tail piece including an outer circumferential surface and an inner circumferential surface, the tail piece at least partially received in the aperture of the male coupling, the male coupling and the tail piece configured to receive a hose therebetween, the hose including a wall defining a central aperture therethrough, the wall compressed in a space formed between the inner circumferential surface of the male coupling and the outer circumferential surface of the tail piece, the wall deformed into the plurality of the spaced apart annular grooves disposed along the inner circumferential surface of the male coupling, wherein the inner circumferential surface of the male coupling includes a radially inwardly extending rib at a boundary between a large diameter portion and a small diameter portion of the aperture, the small diameter portion having a diameter smaller than the large diameter portion, the rib extending radially inwardly from the inner circumferential surface and having a diameter smaller than the small diameter portion, wherein a portion of the tail piece is expanded and deformed to form a plurality of indentations on the inner circumferential surface of the tail piece.

* * * * *